(12) United States Patent
Kim et al.

(10) Patent No.: US 9,718,466 B2
(45) Date of Patent: Aug. 1, 2017

(54) DRIVING PATH PLANNING APPARATUS AND METHOD FOR AUTONOMOUS VEHICLE

(71) Applicant: HYUNDAI MOTOR COMPANY, Seoul (KR)

(72) Inventors: Hoi Won Kim, Gwacheon-si (KR); Su Jung Yoo, Incheon (KR); Min Yong Shin, Seoul (KR); Kyoung Jun Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/834,213

(22) Filed: Aug. 24, 2015

(65) Prior Publication Data

US 2016/0129907 A1    May 12, 2016

(30) Foreign Application Priority Data

Nov. 12, 2014  (KR) ........................ 10-2014-0157366

(51) Int. Cl.
| | |
|---|---|
| *B60W 30/09* | (2012.01) |
| *B60W 30/12* | (2006.01) |
| *G01C 21/34* | (2006.01) |
| *G05D 1/02* | (2006.01) |
| *G06K 9/00* | (2006.01) |
| *G08G 1/16* | (2006.01) |

(52) U.S. Cl.
CPC ............ *B60W 30/09* (2013.01); *B60W 30/12* (2013.01); *G05D 1/0246* (2013.01); *G06K 9/00798* (2013.01); *G06K 9/00805* (2013.01); *G08G 1/165* (2013.01); *G08G 1/166* (2013.01); *G08G 1/167* (2013.01)

(58) Field of Classification Search
CPC .... B60W 30/09; B60W 30/12; G05D 1/0246; G01C 21/3446
USPC ........................................................... 701/26
See application file for complete search history.

(56) References Cited

U.S. PATENT DOCUMENTS 5,646,845 A * 7/1997 Gudat ................ B60K 31/0008
                                                          701/26
7,844,398 B2 * 11/2010 Sato ........................ B25J 9/1666
                                                          700/213

(Continued)

FOREIGN PATENT DOCUMENTS

| | | |
|---|---|---|
| JP | 2011-118570 A | 6/2011 |
| JP | 2011-170843 A | 9/2011 |

(Continued)

*Primary Examiner* — Atul Trivedi
(74) *Attorney, Agent, or Firm* — McDermott Will & Emery LLP (57) ABSTRACT

A driving path planning apparatus for an autonomous vehicle includes a driving information obtainer to obtain crossroad information, current velocity, and velocity setting of the vehicle. A global path planner plans a base frame, and an environment recognizer recognizes obstacle on a path and lane information of the vehicle. The apparatus also includes a velocity profile generator to generate a velocity profile for the vehicle, using current velocity and velocity setting, a candidate path planner to plan candidate paths for the vehicle, using velocity profile and base frame, and a path selector to check whether or not the candidate paths have collision risks and select one candidate path of the candidate paths as a driving path for the autonomous vehicle.

16 Claims, 4 Drawing Sheets

(56) References Cited

U.S. PATENT DOCUMENTS

| | | | |
|---|---|---|---|
| 8,364,366 B2* | 1/2013 | Foessel | B60W 30/09 180/167 |
| 8,849,494 B1* | 9/2014 | Herbach | B60W 30/00 701/24 |
| 8,954,192 B2* | 2/2015 | Ozick | A47L 5/30 700/258 |
| 8,996,224 B1* | 3/2015 | Herbach | G05D 1/0011 180/116 |
| 9,008,890 B1* | 4/2015 | Herbach | B60W 30/00 340/435 |
| 9,177,476 B2* | 11/2015 | Breed | G01C 21/3611 |
| 2008/0046150 A1* | 2/2008 | Breed | B60R 21/0134 701/45 |
| 2010/0106356 A1* | 4/2010 | Trepagnier | G01S 17/023 701/25 |
| 2010/0256836 A1* | 10/2010 | Mudalige | G08G 1/163 701/2 |
| 2010/0324771 A1 | 12/2010 | Yabushita et al. | |
| 2012/0035788 A1* | 2/2012 | Trepagnier | B60W 30/00 701/3 |
| 2013/0253815 A1 | 9/2013 | Orfila et al. | |
| 2013/0274986 A1 | 10/2013 | Trepagnier et al. | |
| 2014/0136414 A1* | 5/2014 | Abhyanker | G06Q 50/28 705/44 |
| 2014/0207325 A1* | 7/2014 | Mudalige | B62D 15/025 701/26 |
| 2015/0166062 A1* | 6/2015 | Johnson | B60W 30/12 701/41 |
| 2015/0185034 A1* | 7/2015 | Abhyanker | G01C 21/36 701/23 |
| 2015/0202770 A1* | 7/2015 | Patron | G05D 1/024 700/245 |
| 2015/0331422 A1* | 11/2015 | Hartung | G05D 1/021 701/23 |
| 2016/0161262 A1* | 6/2016 | Simpson | G01C 21/3438 701/21 |
| 2016/0282874 A1* | 9/2016 | Kurata | G05D 1/0088 |
| 2016/0347310 A1* | 12/2016 | Moran | B60W 30/09 |
| 2017/0038775 A1* | 2/2017 | Park | B60W 50/00 |

FOREIGN PATENT DOCUMENTS

| | | |
|---|---|---|
| KR | 10-0954232 B1 | 4/2010 |
| KR | 10-2010-0106625 A | 10/2010 |
| KR | 10-1133037 B1 | 4/2012 |
| KR | 10-2012-0054879 A | 5/2012 |
| KR | 10-2013-0108200 A | 10/2013 |

* cited by examiner

DRIVING PATH PLANNING APPARATUS AND METHOD FOR AUTONOMOUS VEHICLE

CROSS-REFERENCE TO RELATED APPLICATION

This application is based on and claims the benefit of priority to Korean Patent Application No. 10-2014-0157366, filed on Nov. 12, 2014 in the Korean Intellectual Property Office, the disclosure of which is incorporated herein in its entirety by reference.

TECHNICAL FIELD

The present disclosure relates to a driving path planning apparatus and method for an autonomous vehicle, and more particularly, to a driving path planning apparatus and method for an autonomous vehicle capable of planning a safe driving path by planning path candidate groups to which a change in velocity of the vehicle is reflected and determining whether or not there is a collision risk with obstacles on the planned path.

BACKGROUND

An autonomous vehicle is a vehicle that follows a map based driving path. However, when variables such as obstacles are present on the driving path, the autonomous vehicle performs a control so that the vehicle may be safely driven by changing the driving path in real time.

In the related art, whether or not the vehicle collides with the obstacles has been determined by representing spatial information (a coordinate, a heading angle, a curvature, etc.) of the driving path as a polynomial expression for a movement distance in order to avoid a stationary obstacle. However, when dynamic obstacles are present on the driving path, the autonomous vehicle according to the related art mentioned above may not accurately predict whether or not the vehicle will collide with the dynamic obstacles.

SUMMARY

The present disclosure has been made to solve the above-mentioned problems occurring in the prior art while advantages achieved by the prior art are maintained intact.

An aspect of the present disclosure provides a driving path planning apparatus and method for an autonomous vehicle capable of planning a safe driving path by planning path candidate groups to which a change in velocity of the vehicle is reflected and determining whether or not there is a collision risk with obstacles on the planned path.

According to an exemplary embodiment of the present invention, a driving path planning apparatus for an autonomous vehicle includes a driving information obtainer configured to obtain crossroad information, current velocity, and velocity setting of the autonomous vehicle. The apparatus also includes a global path planner configured to plan a base frame. The apparatus also includes an environment recognizer configured to recognize obstacle on a path and lane information of the autonomous vehicle. The apparatus also includes a velocity profile generator configured to generate a velocity profile for the autonomous vehicle, using the current velocity and the velocity setting. The apparatus also includes a candidate path planner configured to plan one or more candidate paths for the autonomous vehicle, using the velocity profile and the base frame. The apparatus also includes a path selector configured to check whether or not the one or more candidate paths have collision risks and select one candidate path of the one or more candidate paths as a driving path for the autonomous vehicle, based on the checked result.

The driving path planning apparatus may further include a virtual target generator configured to generate a virtual target when the autonomous vehicle enters within a predetermined distance from a crossroad, based on the crossroad information.

The virtual target generator may generate the virtual target, which is in a stopped state, at a point spaced apart from the autonomous vehicle by a distance obtained by adding a distance between the autonomous vehicle and the crossroad and a spare distance.

The spare distance may be a distance between the autonomous vehicle and a preceding vehicle at the time of a longitudinal control.

The velocity profile generator may generate a longitudinal acceleration and deceleration profile for the autonomous vehicle, using velocity of the autonomous vehicle at the time of starting at a starting point on the path and velocity of the autonomous vehicle at the time of arriving at a destination, and wherein the velocity profile generator generates the velocity profile based on the longitudinal acceleration and deceleration profile.

The longitudinal acceleration and deceleration profile is an acceleration profile when acceleration is constant.

The longitudinal acceleration and deceleration profile is an acceleration profile when a rate of change of acceleration is constant.

The candidate path planner may plan candidate paths for each velocity of the autonomous vehicle based on the current velocity by taking account of variation in velocity of the autonomous vehicle for a normal driving state for a predetermined time period.

The path selector may select a candidate path for the autonomous vehicle, of which driving cost is minimal based on a cost function.

The path selector may check whether or not the one or more candidate paths have collision risk and selects the driving path among the one or more candidate paths when the one or more candidate paths have the collision risk.

The path selector may select the driving path by taking account of a degree of collision risk, driving stability, and target path proximity.

The path selector may select the driving path among candidate paths that do not have collision risk when some of the one or more candidate paths do not have collision risk.

The path selector may select the driving path by taking account of driving stability and target path proximity.

According to another exemplary embodiment of the present invention, a driving path planning method for an autonomous vehicle includes checking whether or not the autonomous vehicle is in a lane change mode. The method also includes planning one or more candidate paths by taking account of current velocity of the autonomous vehicle within a current lane and a lane to be changed, when the autonomous vehicle is in the lane change mode. The method also includes checking whether or not the candidate paths planned by taking account of the current velocity have collision risk. The method also includes planning one or more candidate paths for each longitudinal velocity of the autonomous vehicle by taking account of variation in velocity of the autonomous vehicle when the candidate paths planned by taking account of the current velocity have collision risk. The method also includes checking whether the one or more candidate paths for each longitudinal velocity have collision risk. The method also includes selecting a candidate path from the candidate paths as a driving path when the candidate paths for each longitudinal velocity have collision risk.

When one or more of the candidate paths do not have collision risk, a candidate path of the candidate paths that do not have collision risk may be selected as the driving path.

The driving path may be selected by taking account of a degree of collision risk, driving stability, and target path proximity.

The method also includes planning the candidate paths by taking account of velocity setting within the current lane when the autonomous vehicle is not in the lane change mode.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Throughout the present specification, since the terms "comprising", "configuring", "having", and the like mean that the corresponding element may be embedded unless explicitly described to the contrary in the present specification, it means the inclusion of other elements rather than the exclusion of any other elements.

In addition, the terms "-er", "-or", "module", and the like described in the present specification mean units for processing at least one function and operation, and can be implemented by hardware, software, or combinations thereof. In addition, articles such as "a", "an", "the", and the like may be used to include both singular forms and plural forms unless the context clearly indicates otherwise, in the context describing the present disclosure.

Hereinafter, exemplary embodiments of the present invention will be described in detail with reference to the accompanying drawings.

When a driving path for an autonomous vehicle is selected, one of multiple candidate groups of local paths for following a base frame planned by a global path planner (GPP) is selected. The candidate groups of the local paths are determined on the basis of following the base frame, where paths of various cases are planned by taking account of stability of the vehicle or a collision with surrounding obstacles. In order to avoid the collision with the surrounding obstacle at the time of the planning of the path, longitudinal acceleration and deceleration of the vehicle as well as a transverse motion of the vehicle are required. Particularly, in order to determine a collision risk with a dynamic obstacle, temporal information as well as spatial information need to be considered. Therefore, according to the present disclosure, since a movement distance of the path is a value obtained by integrating velocity, velocity is applied as a function of time in order to reflect the temporal information to the path.

Figure 1:
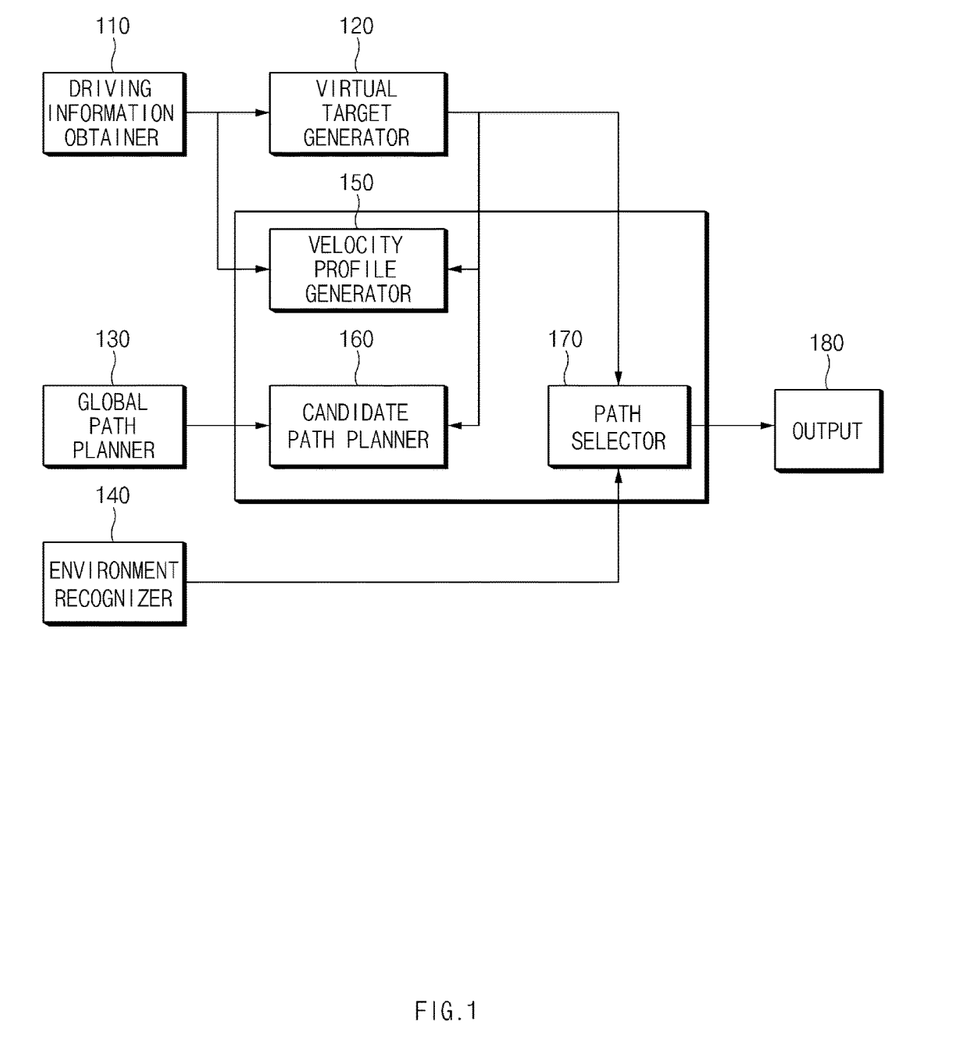
FIG. 1 is a block configuration diagram showing a driving path planning apparatus for autonomous vehicle, according to an exemplary embodiment of the present invention.

FIG. 1 is a block configuration diagram showing a driving path planning apparatus for autonomous vehicle, according to an exemplary embodiment of the present invention.

Referring to FIG. 1, the driving path planning apparatus includes a driving information obtainer 110, a virtual target generator 120, a global path planner 130, an environment recognizer 140, a velocity profile generator 150, a candidate path planner 160, and a path selector 170.

The driving information obtainer 110 collects driving situation information such as crossroad information, current velocity, velocity setting, and the like. The driving information obtainer 110 obtains the crossroad information (crossroad position) and the current velocity (speed) of the vehicle using a variety of sensors (e.g., an image sensor, a velocity sensor, etc.)

The virtual target generator 120 generates a virtual target for a crossroad stop control. For example, the virtual target generator 120 may generate a virtual preceding vehicle at a crossroad stop line position.

The virtual target generator 120 checks whether or not the vehicle enters within a threshold distance, using the crossroad information output from the driving information obtainer 110. That is, the virtual target generator 120 checks whether or not a distance $D_{toC}$ between the vehicle and the crossroad (a distance left to the crossroad) is less than a distance $D_{thld}$ between a point at which the vehicle begins to decelerate when approaching the crossroad and the crossroad (a threshold distance). The vehicle needs to decelerate from a point spaced apart from the crossroad by the threshold distance.

If the vehicle enters within the threshold distance, the virtual target generator 120 generates a stopped (velocity=0 kps) virtual target at a distance obtained by adding a spare distance $D_{margin}$ to the distance between the vehicle and the crossroad. Here, the spare distance is a spare distance from a preceding vehicle at the time of a longitudinal control.

The global path planner 130 generates and output the base frame for autonomous driving of the vehicle.

The environment recognizer 140 senses obstacles positioned on the driving path and collects obstacle information using a variety of sensors (e.g., an image sensor, a velocity sensor, etc.) mounted in the vehicle.

In addition, the environment recognizer 140 obtains lane information of the driving path.

The velocity profile generator 150 generates a vehicle velocity profile on the path using the current velocity obtained by the driving information obtainer 110 and the velocity setting. The velocity profile generator 150 generates a longitudinal acceleration and deceleration profile using velocity of the vehicle at the time of starting at a starting point on the path (at the time of starting the driving) and velocity of the vehicle at the time of arriving at a destination and then generates the velocity profile.

Two exemplary embodiments in which the velocity profile generator 150 generates the longitudinal acceleration and deceleration profile will be described.

First, it is assumed that acceleration of the vehicle at the time of generating the longitudinal acceleration and deceleration profile is constant at the maximum acceleration $a_{max}$, and the constant acceleration is applied to Equation 1 that calculates the velocity profile.

$$v(t) = \int_0^t a(t)dt - v_0 \qquad \text{[Equation 1]}$$

Where, v(t) is a velocity profile, a(t) is an acceleration profile, $v_0$ is initial longitudinal velocity of the vehicle (velocity of the vehicle at the time of starting at the starting point of the path), and t is time.

The acceleration profile a(t) needs to satisfy the following Equation 2.

$$v_{end} - v_0 = \int_{t_0}^{t_{end}} a(t) dt \qquad \text{[Equation 2]}$$

Where $v_{end}$ is longitudinal velocity of the vehicle at the time of arriving at the destination of the path (final velocity of the vehicle), $t_0$ is a time immediately before the vehicle starts at the starting point, and $t_{end}$ is a time at which the vehicle arrive at the destination (a path ending time).

In this case, the velocity profile is expressed by the following Equation 3.

$$v(t) = \begin{cases} a_{max} \times t + v_0 & \text{if } (v_{end} - v_0 > a_{max} \times t_{end}) \\ \dfrac{(v_{end} - v_0)}{t_{end}} t + v_0 & \text{if } (a_{min} \times t_{end} \le v_{end} - v_0 \le a_{max} \times t_{end}) \\ a_{min} \times t + v_0 & \text{if } (v_{end} - v_0 < a_{min} \times t_{end}) \end{cases} \qquad \text{[Equation 3]}$$

Where $a_{max}$ is maximum acceleration and $a_{min}$ is minimum acceleration.

Next, if it is assumed that a rate of change (Jerk J) of acceleration at the time of generating the longitudinal acceleration and deceleration profile is constant, the acceleration profile a(t) needs to satisfy the following Equation 4.

$$v_{end} - v_0 = \int_{t_0}^{t_{end}} a(t) dt, \; a(t_0) = a_0 \; a(t_{end}) = 0 \qquad \text{[Equation 4]}$$

In this case, a velocity profile V(t) may be expressed by the following Equation 5.

$$v(t) = \begin{cases} \dfrac{Jt^2 + 2a_0 t}{2} & \text{if } \left(t \le \dfrac{a_{max} - a_0}{J}\right) \\ a_{max} t - \dfrac{(a_{max} - a_0)^2}{2J} + v_0 & \text{if } \left(\dfrac{a_{max} - a_0}{J} < t \le t_{end} - \dfrac{a_{max}}{J}\right) \\ v_{end} - \dfrac{(t - t_{end})^2}{2J} & \text{if } \left(t_{end} - \dfrac{a_{max}}{J} < t \le t_{end}\right) \\ v_{end} & \text{if } (t_{end} < t) \end{cases} \qquad \text{[Equation 5]}$$

If $a_{max}$ is derived from Equation 5, it is expressed by the following Equation 6.

$$a_{max} = \dfrac{a_0 J^2 + J^3 * t_{end} \pm J \sqrt{\begin{array}{l}(2J(v_{end} - v_c) - 6J^3(v_{end} - v_0) + \\ a_0^2(1 - 2J^2) + J^4 t_{end}^2 + 2a_0 J^3 t_{end})\end{array}}}{(3J^2 - 1)} \qquad \text{[Equation 6]}$$

Where J is a rate of change of acceleration (system variable determined depending on the vehicle).

In this case, the second expression and the third expression of Equation 5 need to be matched to each other at $$t = t_{end} - \dfrac{a_{max}}{J}$$

and the expression having a smaller absolute value among the two values is selected.

The candidate path planner 160 plans path candidate groups using the velocity profile output from the velocity profile generator 150 and the base frame output from the global path planner 130. In this case, the candidate path planner 160 plans one or more candidate paths for each velocity of the vehicle based on the current velocity by taking account of an amount of acceleration and deceleration (variation of velocity of the vehicle) of a normal driving state for a predetermined time period.

The candidate path planner 160 plans a path of an equation of 5th degree based on an arc length such as the following Equation 7 for a predetermined time period (e.g., 5 seconds) from a current time. Longitudinal velocity at the path ending time is determined by assuming the variation in velocity of the vehicle of ±20 kph (kilometers per hour) from the current velocity by taking account of the amount of acceleration and deceleration of the normal driving state for the predetermined time period. For example, in the case in which the current velocity is 80 kph, $v_{end}$ is generated as five path candidate groups such as 60 kph, 70 kph, 80 kph, 90 kph, and 100 kph.

$$\begin{cases} x_{LRP}(s) = a_{x,i}(s - s_i)^5 + b_{x,i}(s - s_i)^4 + c_{x,i}(s - s_i)^3 + \\ \qquad d_{x,i}(s - s_i)^2 + e_{x,i}(s - s_i) + f \\ y_{LRP}(s) = a_{y,i}(s - s_i)^5 + b_{y,i}(s - s_i)^4 + c_{y,i}(s - s_i)^3 + \\ \qquad d_{y,i}(s - s_i)^2 + e_{y,i}(s - s_i) + f \end{cases} \qquad \text{[Equation 7]}$$

Where $x_{LRP}$ is a coordinate in an x axis direction of the local path and $y_{LRP}$ is a coordinate of a y axis direction of the local path. In addition, a, b, c, d, e, and f are parameters for expressing the local path by a curve of an equation of 5th degree, S is a progressing distance of the vehicle, and $s_i$ is a progressing distance of the vehicle when the local path is generated.

The path selector 170 determines collision risk for the respective candidate paths of the path candidate groups planned by the candidate path planner 160 and selects the path depending on the collision risk determination result.

In other words, the path selector 170 checks whether or not each of the candidate paths planned by the candidate path planner 160 has the collision risk with obstacles.

In a case in which one or more of the candidate paths are paths that do not collide with the obstacle, the path selector 170 selects a candidate path in which a cost function λ becomes a minimum MIN(λ) by applying weights to driving stability and target path proximity, as a driving path among the candidate paths having no collision risk.

$$\lambda = \alpha \times D_{toLRP} + \beta \times \rho_{max} \qquad \text{[Equation 8]}$$

Where α and β are weights for each parameter, $D_{toLRP}$ is a distance from a local reference path, and $\rho_{max}$ is a maximum curvature on the path.

Meanwhile, in a case in which the candidate paths have the collision risk, the path selector 170 selects a candidate path in which the cost function becomes the minimum by applying the weights to a degree of collision risk, driving stability, and target path proximity, as the driving path.

$$\lambda = \alpha \times D_{toLRP} + \beta \times \rho_{max} + \gamma \times TTC \qquad \text{[Equation 9]}$$

Where γ is a weight for a time to collision (TTC).

The degree of collision risk is determined using a time (time to collision (TTC)) taken until the vehicle collides with the obstacle, the driving stability is determined using a maximum curvature $\rho_{max}$ on the path, and the target path proximity is determined using a distance $D_{toLRP}$ between the local reference position and the path.

When the path selection is completed, the path selector 170 regards information of the selected path and the obstacle on the selected path as a target and outputs obstacle information (position, velocity, etc.).

An output (180) outputs the selected path and the target information which are output from the path selector 170. The output 180 outputs image information and audio information through a display device and an acoustic output device (e.g., speaker). The display device may include one or more of a liquid crystal display (LCD), a thin film transistor-liquid crystal display (TFT LCD), an organic light-emitting diode (OLED), a flexible display, a three-dimensional (3D) display, a transparent display, a head-up display (HUD), and a touch screen.

Figure 2:
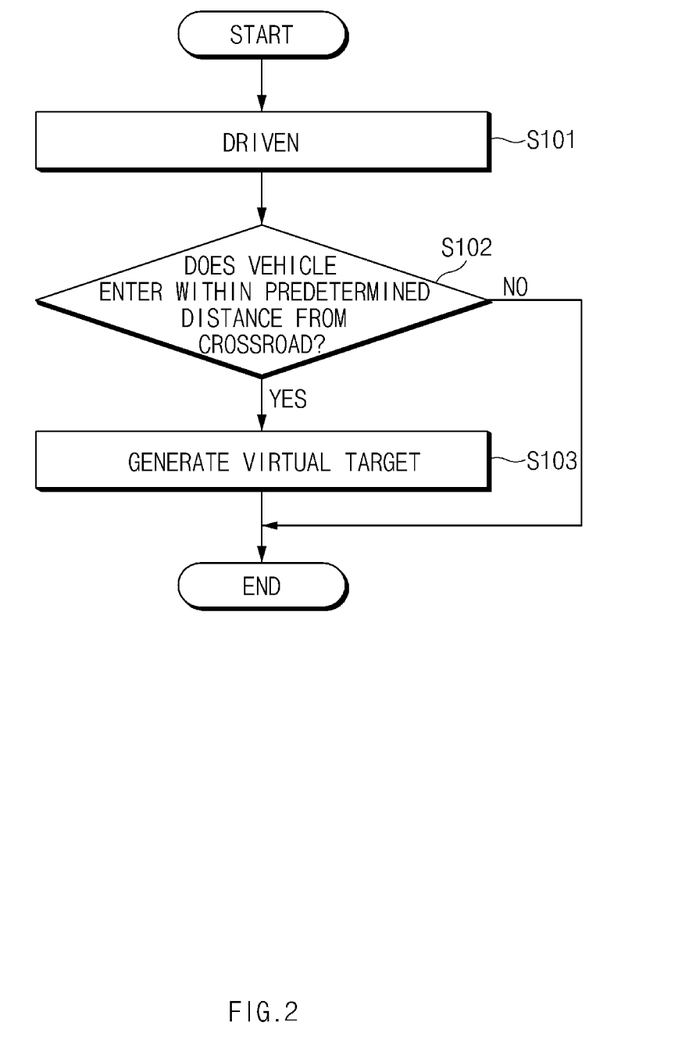
FIG. 2 is a flowchart illustrating an operation of a virtual target generator shown in FIG. 1.

FIG. 2 is a flowchart illustrating an operation of the virtual target generator shown in FIG. 1.

Referring to FIG. 2, the virtual target generator 120 of the driving path planning apparatus checks whether or not the vehicle enters within a predetermined distance from a crossroad while the vehicle is in a general driving state (S101 and S102).

If the vehicle enters within the predetermined distance from the crossroad, the virtual target generator 120 generates a virtual target which is in a stopped state at a front of the vehicle (S103). In this case, the virtual target generator 120 generates the virtual target at a point spaced apart from a current position of the vehicle by a distance calculated by adding a distance between the vehicle and the crossroad and a set spare distance.

Thereafter, the autonomous vehicle is stopped at the crossroad by a following control on the virtual target.

Figure 3:
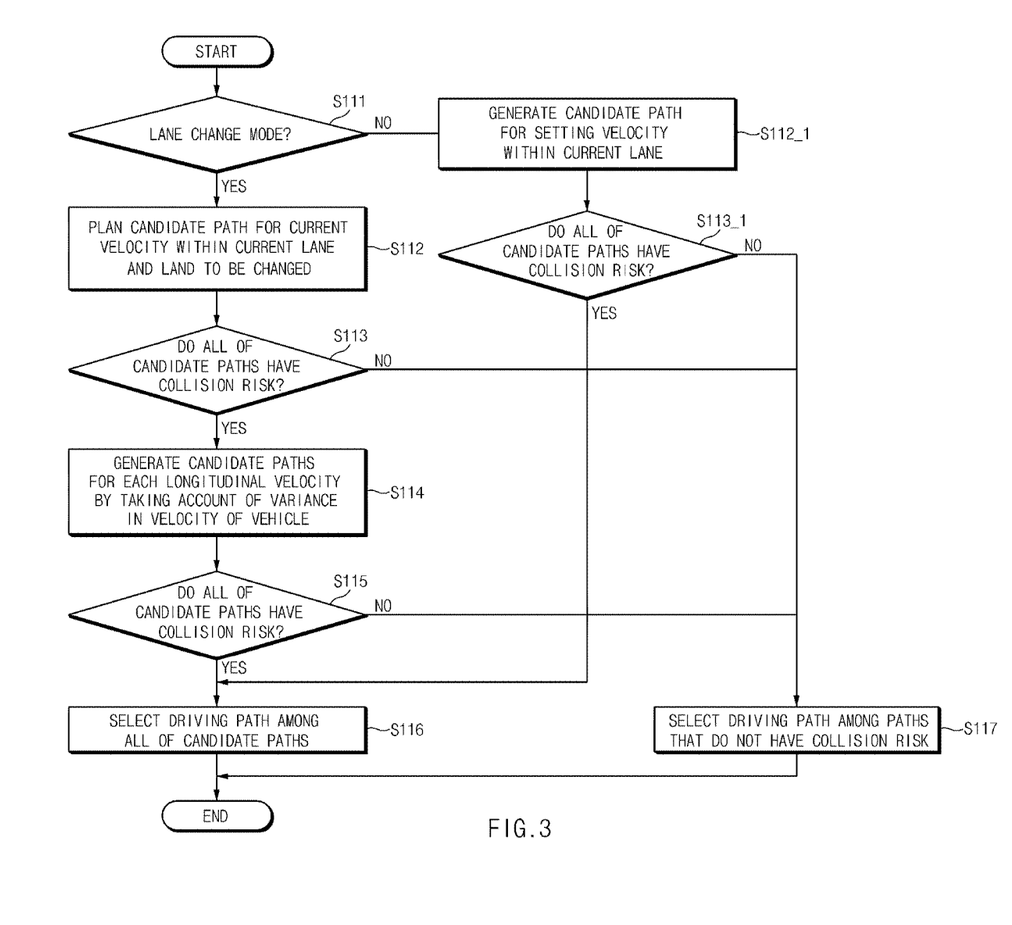
FIG. 3 is a flowchart showing a driving path planning method for autonomous vehicle, according to an exemplary embodiment of the present invention.
Figure 4:
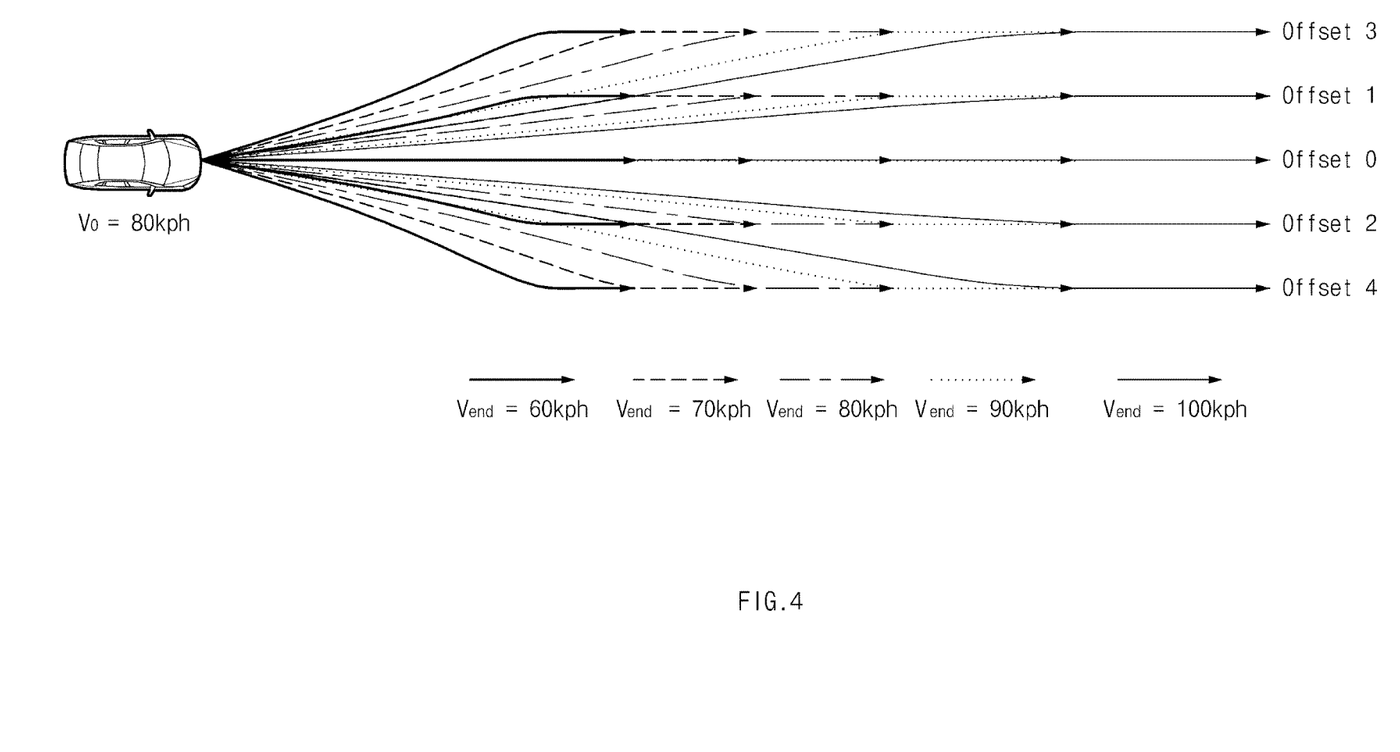
FIG. 4 is a diagram showing an example of a planned candidate path, according to an exemplary embodiment of the present invention.

FIG. 3 is a flowchart showing a driving path planning method for autonomous vehicle, according to an exemplary embodiment of the present invention. FIG. 4 is a diagram showing an example of a planned candidate path, according to an exemplary embodiment of the present invention.

As shown in FIG. 3, the driving path planning apparatus checks whether or not the vehicle is in a lane change mode, using the driving information obtainer 110 (S111).

If the vehicle is in the lane change mode (S111, Yes), the driving path planning apparatus generates one or more candidate paths for current velocity within a current lane and generates one or more candidate paths for current velocity within a lane to be changed (S112). For example, the driving path planning apparatus plans three candidate paths having three offsets within the current lane and plans three candidate paths having three offsets within the lane to be changed.

The driving path planning apparatus checks whether or not the planned candidate paths have collision risk (S113).

If the candidate paths have the collision risk (S113, Yes), the driving path planning apparatus plans a candidate path for each longitudinal velocity by taking account of variation (e.g., ±10 kps and ±20 kps) in velocity of the vehicle based on the current velocity (S114). For example, as shown in FIG. 4, if the current velocity is 80 kps and the variation in velocity of the vehicle is ±20 kps, the driving path planning apparatus plans five path candidate groups for 60 kps, 70 kps, 80 kps, 90 kps, and 100 kps. Each path candidate group is configured of candidate paths for each five offsets.

The driving path planning apparatus checks whether or not the planned candidate paths for each longitudinal velocity have collision risk (S115).

Herein, if the planned candidate paths for each longitudinal velocity have collision risk (S115, Yes), the driving path planning apparatus may change variation in velocity of the vehicle and repeatedly perform the operations S114 and S115 of planning the candidate path for each longitudinal velocity (not shown in the drawing). The number of repetition times may be two times, three times, or more.

If the candidate paths have the collision risk (S115, Yes), the driving path planning apparatus selects one candidate path of the candidate paths as a driving path, using a cost function (S116). In this case, the driving path planning apparatus calculates costs by applying weights to a degree of collision risk (TTC), driving stability (a maximum curvature on the path), and target path proximity (a distance between a local reference position and the path) among parameters of the cost function. In addition, the driving path planning apparatus selects a candidate path of which the calculated cost is minimal as the driving path.

Meanwhile, if one or more candidate paths of the candidate paths do not have the collision risk (S115, No), the driving path planning apparatus selects one candidate path of the candidate paths which do not have the collision risk as the driving path, using the cost function (S117). In this case, the driving path planning apparatus calculates costs by applying weights to driving stability and a distance between a local reference position and the path among the parameters of the cost function. In addition, the driving path planning apparatus selects a candidate path of which the calculated cost is minimal as the driving path.

Meanwhile, if the vehicle is not in the lane change mode (S111, No), the driving path planning apparatus generates candidate paths for set velocity within the current lane (S112_1).

The driving path planning apparatus checks whether or not the planned candidate paths have collision risk (S113_1).

If the planned candidate paths have the collision risk (S113_1, Yes), the driving path planning apparatus selects one candidate path of the candidate paths as the driving path, using the cost function (S116).

Meanwhile, if one or more candidate paths of the planned candidate paths do not have the collision risk (S113_1, No), the driving path planning apparatus selects one candidate path of the candidate paths which do not have the collision risk as the driving path, using the cost function (S117). Since the selecting of the driving path using the cost function is described above, a detailed description thereof will be omitted.

As described above, according to the exemplary embodiments of the present invention, whether or not there is a collision risk with the obstacle is determined by taking account of velocity of the vehicle at the time of the plan of the driving path of the autonomous vehicle. The collision with the dynamic obstacle as well as the stationary obstacle is predicted, thereby making it possible to plan a safe driving path.

In addition, according to the exemplary embodiments of the present invention, since the path is planned by varying velocity, the vehicle may effectively change the lane and may be driven in a vehicle congestion situation.

The exemplary embodiments described above are those in which the components and features according to the present disclosure are coupled to each other in a predetermined form. The respective components or features should be considered being selective unless explicitly stated. The respective components or features may be implemented in a form in which they are not coupled to other components or features. It is also possible to configure the exemplary embodiment of the present invention by coupling some components and/or features. An order of operations described in the exemplary embodiments of the present invention may be changed. Some configurations or features of any exemplary embodiment may be included in other exemplary embodiments or may be exchanged with corresponding configurations or features in other exemplary embodiments. It will be apparent that the accompanying claims which do not have an explicit recitation relationship in the following claims are coupled to configure exemplary embodiments or may be included as new claims by an amendment after being filed.

The exemplary embodiments of the present invention may be implemented by various means, for example, hardware, firmware, software, or a combination thereof, or the like. In the implementation by hardware, an exemplary embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the implementation by firmware or software, an exemplary embodiment of the present invention may be implemented in forms such as modules, procedures, functions, or the like, that perform functions or operations described above. Software codes are stored in a memory unit and may be driven by a processor. The memory unit is disposed inside or outside the processor and may transmit and receive data to and from the processor by the well-known various means.

It is apparent to those skilled in the art that the present disclosure may be embodied in other specific forms without departing from features of the present disclosure. Accordingly, the detail description as described above is not interpreted as being limited in all views, but is to be considered as being illustrative. The scope of the present disclosure should be determined by reasonable interpretation of the accompanying claims, and all modifications which fall in the equivalent scope of the present disclosure are included in the scope of the present disclosure.

What is claimed is:

1. A driving path planning apparatus for an autonomous vehicle, the driving path planning apparatus comprising a processor configured to perform steps of:
    obtaining crossroad information, current velocity, and velocity setting of the autonomous vehicle;
    planning a base frame;
    recognizing an obstacle on a path and lane information of the autonomous vehicle;
    generating a velocity profile for the autonomous vehicle, using the current velocity and the velocity setting;
    planning one or more candidate paths for the autonomous vehicle, using the velocity profile and the base frame;
    checking whether or not the one or more candidate paths have collision risks; and
    selecting one candidate path of the one or more candidate paths as a driving path for the autonomous vehicle, based on a checked result,
    wherein the processor plans the one or more candidate paths for each longitudinal velocity of the autonomous vehicle based on the current velocity by taking account of variation in velocity of the autonomous vehicle when the one or more candidate paths have collision risks.

2. The driving path planning apparatus according to claim 1, wherein the processor generates a virtual target when the autonomous vehicle enters within a predetermined distance from a crossroad, based on the crossroad information.

3. The driving path planning apparatus according to claim 2, wherein the processor generates the virtual target, which is in a stopped state, at a point spaced apart from the autonomous vehicle by a distance obtained by adding a distance between the autonomous vehicle and the crossroad and a spare distance.

4. The driving path planning apparatus according to claim 3, wherein the spare distance is a distance between the autonomous vehicle and a preceding vehicle at the time of a longitudinal control.

5. The driving path planning apparatus according to claim 1, wherein the processor generates a longitudinal acceleration and deceleration profile for the autonomous vehicle, using velocity of the autonomous vehicle at the time of starting at a starting point on the path and velocity of the autonomous vehicle at the time of arriving at a destination, and wherein the velocity profile generator generates the velocity profile based on the longitudinal acceleration and deceleration profile.

6. The driving path planning apparatus according to claim 5, wherein the longitudinal acceleration and deceleration profile is an acceleration profile when acceleration is constant.

7. The driving path planning apparatus according to claim 5, wherein the longitudinal acceleration and deceleration profile is an acceleration profile when a rate of change of acceleration is constant.

8. The driving path planning apparatus according to claim 1, wherein the processor selects a candidate path for the autonomous vehicle, of which driving cost is minimal based on a cost function.

9. The driving path planning apparatus according to claim 1, wherein the processor checks whether or not the one or more candidate paths have collision risk and selects the driving path among the one or more candidate paths when the one or more candidate paths have collision risk.

10. The driving path planning apparatus according to claim 9, wherein the processor selects the driving path by taking account of a degree of collision risk, driving stability, and target path proximity.

11. The driving path planning apparatus according to claim 1, wherein the processor selects the driving path among candidate paths that do not have collision risk when some of the one or more candidate paths do not have collision risk.

12. The driving path planning apparatus according to claim 11, wherein the processor selects the driving path by taking account of driving stability and target path proximity.

13. A driving path planning method for an autonomous vehicle, the driving path planning method comprising:
    checking, by a processor, whether or not the autonomous vehicle is in a lane change mode;
    planning, by the processor, one or more candidate paths by taking account of current velocity of the autonomous vehicle within a current lane and a lane to be changed, when the autonomous vehicle is in the lane change mode;
    checking, by the processor, whether or not the one or more candidate paths planned by taking account of the current velocity have collision risk;
    planning, by the processor, one or more candidate paths for each longitudinal velocity of the autonomous vehicle based on the current velocity by taking account of variation in velocity of the autonomous vehicle when the one or more candidate paths planned by taking account of the current velocity have collision risk;

checking, by the processor, whether the one or more candidate paths for each longitudinal velocity have collision risk; and selecting, by the processor, a candidate path from the one or more candidate paths as a driving path when the one or more candidate paths for each longitudinal velocity have collision risk.

14. The driving path planning method according to claim 13, wherein when the one or more the candidate paths do not have collision risk, a candidate path of the candidate paths that do not have collision risk is selected as the driving path.

15. The driving path planning method according to claim 14, wherein the driving path is selected by taking account of a degree of collision risk, driving stability, and target path proximity.

16. The driving path planning method according to claim 13, further comprising planning the candidate paths by taking account of velocity setting within the current lane when the autonomous vehicle is not in the lane change mode.

* * * * *